US011701977B2

(12) United States Patent
Dobie et al.

(10) Patent No.: US 11,701,977 B2
(45) Date of Patent: Jul. 18, 2023

(54) KERBSIDE VEHICLE CHARGER

(71) Applicant: Connected Kerb Limited, London (GB)

(72) Inventors: Nicholas Alexander Dobie, Stevenage (GB); Stephen James Richardson, London (GB)

(73) Assignee: Connected Kerb Limited, London (GB)

( * ) Notice: Subject to any disclaimer, the term of this patent is extended or adjusted under 35 U.S.C. 154(b) by 292 days.

(21) Appl. No.: 16/956,574

(22) PCT Filed: Dec. 20, 2018

(86) PCT No.: PCT/GB2018/053710
§ 371 (c)(1),
(2) Date: Jun. 20, 2020

(87) PCT Pub. No.: WO2019/122890
PCT Pub. Date: Jun. 27, 2019

(65) Prior Publication Data
US 2021/0122259 A1    Apr. 29, 2021

(30) Foreign Application Priority Data
Dec. 20, 2017  (GB) ...................................... 1721443

(51) Int. Cl.
*B60L 53/14*    (2019.01)
*B60L 53/12*    (2019.01)
(Continued)

(52) U.S. Cl.
CPC ............... *B60L 53/14* (2019.02); *B60L 53/12* (2019.02); *B60L 53/16* (2019.02); *B60L 53/305* (2019.02);
(Continued)

(58) Field of Classification Search
CPC ........... B60L 53/12; B60L 53/66; B60L 53/14
See application file for complete search history.

(56) References Cited

U.S. PATENT DOCUMENTS

| 6,614,204 B2 | 9/2003 | Pellegrino et al. |
| 2003/0120442 A1* | 6/2003 | Pellegrino ............. G07F 15/005 702/63 |

(Continued)

FOREIGN PATENT DOCUMENTS

| DE | 10 2010 011 705 A1 | 9/2011 |
| EP | 2 959 568 B1 | 4/2018 |

(Continued)

OTHER PUBLICATIONS

International Search Report for International Patent Application No. PCT/GB2018/053710, dated Mar. 26, 2019.

(Continued)

*Primary Examiner* — David V Henze-Gongola
(74) *Attorney, Agent, or Firm* — Potomac Law Group, PLLC

(57) ABSTRACT

A charging apparatus for a vehicle where a terminal (1, FIG. 2) is connected to at least one kerbside power/data unit (9) to provide a power (4) and a data connection (5) to the power/data unit (9), the power/data unit (9) being connected to a nearby vehicle (17) to provide power to charge the vehicle (17) and receive data from the vehicle (17). The fact that the kerbside power/data unit (9) can charge a vehicle (17) using power supplied from a terminal (1, FIG. 2) and can transmit data from the vehicle (17) to the terminal (1, FIG. 2) provides the power and data requirements for connected autonomous vehicles at a kerbside location.

19 Claims, 3 Drawing Sheets

(51) Int. Cl.
   *B60L 53/66* (2019.01)
   *B60L 53/30* (2019.01)
   *B60L 53/16* (2019.01)
   *B60L 53/31* (2019.01)
   *G05B 15/02* (2006.01)
   *H02J 7/00* (2006.01)
   *H02J 3/32* (2006.01)

(52) U.S. Cl.
   CPC ............ *B60L 53/31* (2019.02); *B60L 53/66* (2019.02); *G05B 15/02* (2013.01); *H02J 3/322* (2020.01); *H02J 7/0042* (2013.01); *H02J 7/0045* (2013.01); *H02J 7/0013* (2013.01); *H02J 2310/48* (2020.01)

(56) References Cited

U.S. PATENT DOCUMENTS

| | | | | |
|---|---|---|---|---|
| 2010/0274656 | A1* | 10/2010 | Genschel | B60L 53/80 705/14.27 |
| 2010/0283426 | A1* | 11/2010 | Redmann | B60L 3/0069 320/109 |
| 2011/0011930 | A1* | 1/2011 | Starr | G07F 17/42 235/382 |
| 2011/0094840 | A1 | 4/2011 | Sakita | |
| 2012/0153894 | A1* | 6/2012 | Widmer | H02J 50/12 320/108 |
| 2013/0110296 | A1* | 5/2013 | Khoo | H04W 4/40 700/286 |
| 2013/0169227 | A1* | 7/2013 | Tremblay | B60L 53/63 320/109 |
| 2013/0268433 | A1 | 10/2013 | Viner et al. | |
| 2014/0021908 | A1* | 1/2014 | McCool | H02J 7/02 320/108 |
| 2017/0106762 | A1* | 4/2017 | Dow | B60L 53/36 |
| 2017/0164179 | A1 | 6/2017 | Jeon et al. | |
| 2018/0015836 | A1* | 1/2018 | Madon | B60L 53/65 |
| 2018/0186246 | A1* | 7/2018 | Kudo | B60L 58/12 |
| 2019/0267822 | A1* | 8/2019 | Waffner | E02D 27/016 |

FOREIGN PATENT DOCUMENTS

| | | | |
|---|---|---|---|
| NL | 2 015 058 B1 | 8/2016 | |
| WO | WO-2018086769 A1 * | 5/2018 | ............ B60L 53/302 |

OTHER PUBLICATIONS

International Preliminary Report on Patentability for International Patent Application No. PCT/GB2018/053710, dated Jul. 2, 2020.

Search Report dated Jul. 5, 2018, in British Patent Application No. GB1721443.8.

* cited by examiner

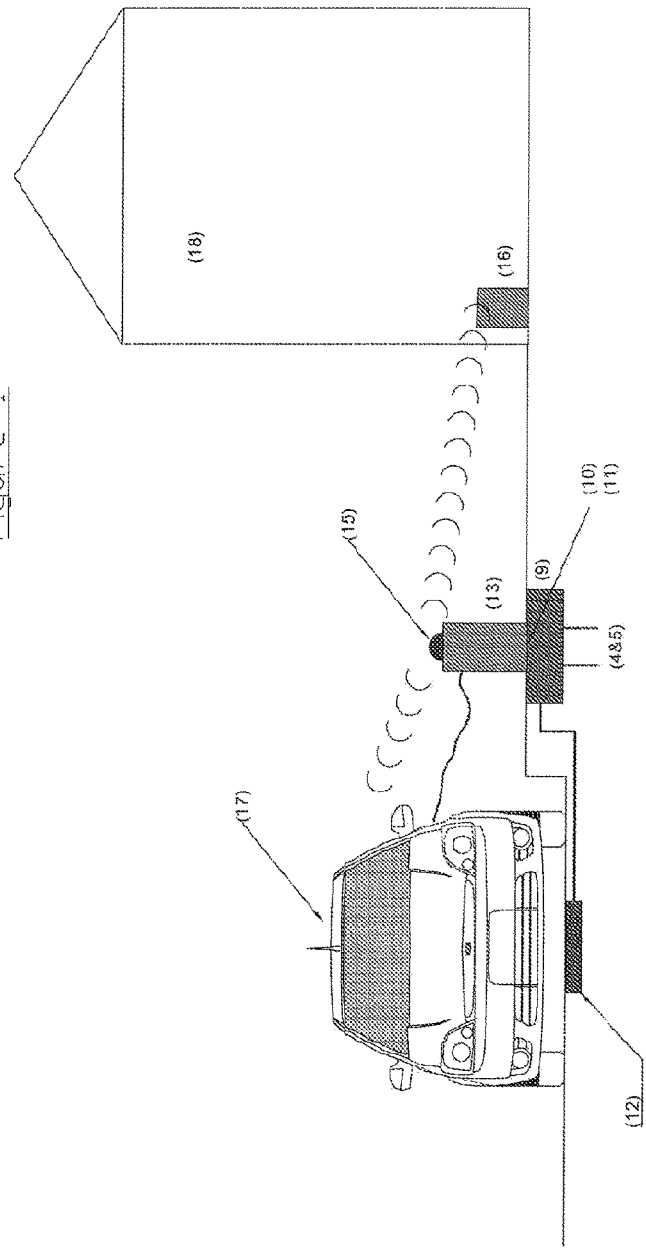
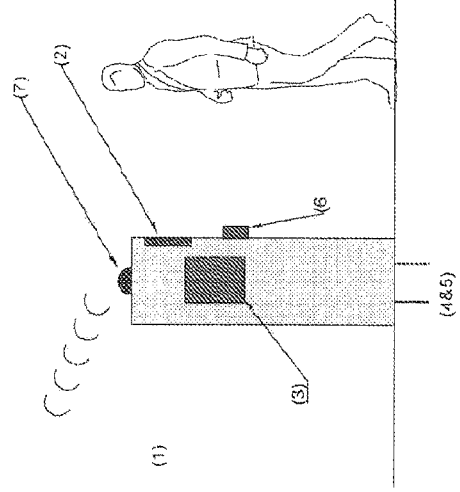

KERBSIDE VEHICLE CHARGER

Embodiments described herein generally relate to apparatus, systems and methods to electrically charge electric vehicles, and in some embodiments enable secure, high speed data communication through the transfer of data between a vehicle, charger and for the use by a consumer, on the street, or in a dwelling.

We have begun a period of change in the way motor vehicles are powered and driven and the UK Government has committed to banning the sale of all petrol and diesel vehicles by 2040. The removal of these vehicles will not only help the Government achieve their carbon reduction targets, but tackle health challenges and lower noise pollution too. The most common form of charging an electric vehicle is at home on the driveway during the evening and during the night, however, a significant number of UK residents do not have their own parking facilities and rely on parking their vehicle on the street. With the committed development of Connected Autonomous Vehicles (CAV), it is predicted that over the coming years there will be wide scale deployment of CAV, which in turn require a facility to autonomously charge and transfer usage data to and from the vehicle when both being operated by the user and autonomously.

The installation of charge points through the UK has to date been sporadic and focus has been placed by existing providers on providing both homeowner and destination based charge systems.

The mass scale roll out of residential street chargers will in turn increase the peak demand for electricity during peak charge times and requires the EV charging networks to help manage this demand through smart charging.

It would therefore be desirable to provide a wider scale roll out of low cost, kerb side smart charging points that will preferably serve on street parking locations and car parks with the transfer of electricity to the vehicle and data to both the vehicle and nearby residential dwellings.

In a first aspect of the invention, there is provided a charging apparatus for vehicles, wherein the charging apparatus comprises: a terminal, wherein the terminal is configured to receive power from a source and have a high speed, secure data connection to a source; and at least one power/data unit positioned at a roadside, wherein the at least one power/data unit is connected to the terminal such that power and data can be transferred between the terminal and the power/data unit; wherein the at least one power/data unit is configured to provide power to a vehicle, and receive and/or transmit data from a vehicle. This provides the advantages of providing a two-way data connection for receiving data from a vehicle for uploading to the cloud, (which is mandated for connected autonomous vehicles under the UK AEV Act 2018) and providing a power connection for charging the vehicle from the same power/data unit. In some embodiments the vehicle is an adjacent or nearby vehicle to the power/data unit. A roadside can refer to an urban or residential street, particularly a street with pavements having kerbs, or can refer to a location next to a parking space in a car park or lot.

In a further aspect of the invention there is provided a power and data access system for vehicles, wherein the system comprises a terminal, wherein the terminal is configured to receive power from a power source and have a high speed (preferably 4G or 5G or fibre) data connection to a data source; at least one power/data unit wherein, when in use, is positioned at a parking spot for vehicles and at a level below a surface of the ground, wherein the at least one power/data unit is connected to the terminal such that power and data can be transferred between the terminal and the power/data unit; a charger unit removably connected to the power/data unit, wherein, when in use, the charger unit having an electrical connection to the power/data unit to allow power to be transferred; wherein the at least one power/data unit is configured to transfer power to or from a vehicle, and configured to, by wired or wireless connection, transfer data to or from a vehicle or a user in wireless range. This provides the advantages as discussed above, such as having a two-way data connection for receiving data from a vehicle for uploading to the cloud which is particularly required for connected autonomous vehicles and for receiving data from the wider telecoms network. This also provides a power connection for charging the vehicle from the same power/data unit and also allows the power to be taken from electric vehicles and fed back into the grid or other nominated local power supply (district or dwelling), if required, such as for load balancing of the grid. In other embodiments, a power source can be a battery which can be located locally to the power/data unit or connected to a series of power/data units and power can be fed to and from this. A number of power/data units (and associated charger units) can be provided for each terminal, thus providing a number of charging and data locations for vehicles and data users.

The charger unit (or 'charge point') being removable allows for the power/data to be installed in advance and placed under a pavement or other road surface before the visual element of the system is provided. This not only minimises the items placed above ground, this also allows the exchange of the charger unit, for updates or changes in features for instance, without the need for large works or infrastructure changes. This also provides the advantage or allowing equipment to be housed within an underground unit and thus protecting it from damage, particularly where sensitive equipment is used.

The user in wireless range can be a person walking past the system, a car driving past, or more permanent users, such as houses, businesses or fixed location data users, such as bus stops. Although the word 'dwelling' is used below, this can apply to all of these situations.

High-speed data, as referred to throughout, can refer to a data transfer speed of at least 350 MB/s. In some embodiments the high-speed data has a data transfer speed of at least 1 GB/s. In further embodiments, high-speed data is a data transfer speed of at least 10 Gbps.

The positioning at a parking spot ensures that the power/data unit (sometimes referred to as a power and data 'box') is near to the vehicle to provide the power and data services required. The actual location of the power/data units can be under a footpath, walkway or pavement at the side of a road, i.e. at a kerbside. This ensures that there is reduced disruption to traffic when installing the power/data units and that access to the power/data units for maintenance can be performed safely.

In an embodiment the power/data unit comprises an access point for providing a wireless connection to the high-speed data connection. This allows a data connection to be fed to the power/data unit in various forms and then can be modified to the required access using a suitable access point. This also allows the access point to be changed for emerging technologies or updates without needing to make large changes to infrastructure. The access point can be connected to or include a router, as appropriate for the data connection.

In an embodiment the data transferred by the high-speed data connection is encrypted or 'secured' data by using a security protocol. This ensures that the data is secure and more particularly so that data between a user and a server is encrypted or secured. Suitable security protocols include but are not limited to HTTPS.

In an embodiment an aerial is provided to connect to the high-speed data connection within the power/data unit to provide increased wireless range. This allows at least part of the data connection to terminate within the power/data unit at, for instance, an access point or router and therefore keep these items secured and safe within the power/data unit. An aerial can then be used, either within the power/data unit, such as using the lid of the cover plate, or fed to the outside of it, for instance to the charger unit, feeder pillar or cabinet or other location, to provide access to the data connection wirelessly.

In an embodiment the aerial is located in the charger unit. This can keep the aerial safe from damage, within the charger unit, yet still above a ground surface to allow an increased range.

In an embodiment a socket is provided in the charger unit by which the transfer of power to or from a vehicle and the power/data unit is via the socket. This allows the power connection and necessary conversion and control of the power to be housed within the power/data unit and the accessible component in the charger unit above a ground surface is the socket required for the power. This can then be connected to the vehicle. In some embodiments there are other means of charging such as inductive charging. These can be instead or in addition to a physical socket. The socket can also be for the transfer of data to and from the vehicle where a wired connection is used, for instance, there can be a common cable for the power and data transfer, or there can be a further socket In an embodiment the power/data unit is sealable by a lid, wherein, when in use, the power/data unit lid sits flush with the surface of the ground. This provides the advantage of having equipment underground but being securely held within the power/data unit. This is sealed to prevent water ingress, yet can be accessed (by a technician, for instance) for maintenance or for connecting additional equipment, such as the charger unit.

In an embodiment the charging unit is a low-level unit for positioning directly on the ground or a post unit for attaching to a post. This provides the advantage of where visible infrastructure is installed, it is done so in a manner that does not cause street clutter, such as being low level, or uses already present 'street' level infrastructure, such as lamp-posts, instructional or advisory traffic management sign posts, including parking instruction sign posts.

In an embodiment the charging unit comprises an RFID reader, wherein enabling the transfer of power to or from a vehicle is via interaction with the RFID reader. This provides the advantage of being able to identify the charger unit by a tap of an RFID enabled device. This could further link to a mobile phone app to enable the power or data use from the charger unit. In some embodiments interaction with the power or data transfer can be via an app. In further embodiments, a sensor can automate the interaction. Therefore the burden on the user to take particular actions to, e.g. use a data connection, can be reduced.

In an embodiment the charging unit comprises illuminating means, wherein in use, the illuminating means is configured to illuminate the charging unit or an area around the charging unit. The illuminating means can illuminate part of a kerb or pavement or itself for increased visibility, such as to alert as to where the charger unit is positioned or to prevent tripping over a charger unit at night. This can provide safety. In some embodiments the illuminating means can project an advert or notice on the charger unit, pavement or kerb. This can be a high-quality image. In further embodiments still there is provided a motion sensor to activate or vary the illumination means. This ensures that the light appears or increases in visibility when there is movement nearby and saves energy whilst avoiding light pollution. In an embodiment the image can be changed (manually or remotely). This allows different messages or adverts to be displayed, or even changes adverts in response to the user that walks past. In an embodiment, where a post is used with the charging means, the illuminating means is integrated into the post.

In an embodiment the power/data unit comprises a controller for controlling the data transfer and/or power transfer. The controller provides various functions of the system such as allowing power transfer to commence, for instance, when a user is authenticated, it also controls the supply of data and power, such as limiting data use when it is required for a transfer with higher priority elsewhere, or feeding power back as a power source, such as for load balancing of the grid. It also provides the scheduling functions to ensure that a vehicle is adequately charged within a specific timeframe. In further embodiments this function is carried out by network edge computing housed within the power/data unit. These components can reduce latency as control functions are carried out locally instead of being remotely provided.

In an embodiment IoT components are connected to the power/data unit. Internet of Things (IoT) components can expand the functionality of the system. For instance, these can include features such as parking sensors to detect if a vehicle is using the parking bay (thus ensuring that charging can only commence when a vehicle is present) or environmental sensors, such as noise, air quality or traffic sensors. In some embodiments the IoT components are housed within the power/data unit where possible to protect sensitive components, so that only the items required to be outside are placed outside the power/data unit, such as a sensor head.

In an embodiment the power/data unit is configured to provide access to a data network, i.e. data access. Since the power/data unit has a data connection for the vehicle, it is advantageous that the data connection can also be used for access to a data network such as general internet access and the like through fibre or cellular.

In an embodiment the data access is provided to a dwelling. In some embodiments the dwelling is a nearby or adjacent dwelling. This provides the advantage of instead of running a data connection to a house, houses or residents of houses can use the data connection of the power/data unit as their data connection for internet access and the like. Other connections can include a data connection between a vehicle and a home/place of business. This connection can allow increased functionality, such as monitoring when a car arrives and turning on lights in a home, other data transfer can include the providing of status updates of the vehicle, etc.

In an embodiment the data source is a high-speed data source. This allows for the large amounts of data that are collected by connected autonomous vehicles and can also provide high speed data for the nearby dwellings that connect to the power/data units for data.

In an embodiment the power source is connected to the power grid. This ensures that sufficient power is available for the charging of vehicles that are connected to the power/data units.

In an embodiment the data received from the vehicle to the power/data unit is transferred to the terminal. This provides the advantage that the data from the CAV is routed through the high-speed data connection.

In an embodiment the power/data unit is placed at a kerbside and does not protrude above a pavement surface. Therefore, the power/data unit is under a pavement surface such that its top surface is flush with the pavement, or at least access is from the surface of a pavement. This ensures that the power/data unit is not a hazard to the public on a pavement, walkway or road and is out of sight until such time that it is required to be used when a technician can access the power/data unit to install a charger unit in connection to it and then the power/data unit remains out of sight.

In an embodiment the power/data unit is connectable to a charging unit, the charging unit providing the connection to provide power to a vehicle. This allows a charging unit to be connected to a pre-installed power/data unit when it is required. In some embodiments, the power/data unit has a universal type connection so that any charging unit can be connected. In some embodiments the charging unit also has a data connection to the vehicle.

In an embodiment the charging point provides the data access. This allows the charging unit to be the data connection for the nearby dwelling and allows the simple upgrade of a connection as technology evolves and also allows for different providers to provide their charging unit for the data access.

In an embodiment the data access is accessed by a WiFi booster. This allows a dwelling to only require a WiFi booster to provide the data access for the dwelling. In some embdoiments other types of boosters or connections can be used such as 5G booster. This allows the varying of the types of connection required.

In an embodiment the data connection between the terminal and the power/data unit is via a copper coaxial cable or fibre optic cable. This provides the advantage of providing data access to the power/data unit.

In an embodiment when plurality of power/data units is provided, each power data unit has a direct data connection to the terminal. This prevents data throttling to each power/data unit dependent on other power data units and also provides a reliable connection should there be an issue with another of the cables.

In an embodiment when a plurality of power/data units is provided they are connected in series to the power supplied from the terminal.

In a further aspect of the invention there is provided a power and data unit for charging electric vehicles, the power/data unit comprising: data and power connections; and a universal connector that is connectable to a further unit or charging unit that provides access to at least one of data and power from the power/data unit, wherein the power/data unit is installable at a kerbside and under a pavement. This provides the advantage of having a power/data unit at a roadside that is accessible to a vehicle that requires power or a data connection and the power/data unit is not visible but can be connected to a further unit that can be connected to the vehicle, as required.

In a further aspect of the invention there is provided a power/data unit for charging electric vehicles, the power/data unit comprising: data and power connections for transferring power and data between a power and data source; and a universal connector that is connectable to a further unit that provides access to at least one of data and power from the power/data unit, wherein the power/data unit is installable at a parking location for vehicles and does not protrude above a surface of a walkway when in use. This provides the advantage of the power/data unit being installable at a roadside to for vehicle access for at least one of a power or a data connection yet being positioned under a surface of a walkway, pavement or roadside. This ensures that the connections and components inside the power/data unit are protected not only from damage such as vehicles, but also from weather. It also provides safety in that the power/data unit is positioned beneath the walkway so that it is not an obstruction/hazard. Furthermore, noise from the components in the power/data unit is supressed by it being positioned underground, thus also reducing any noise nuisance.

In an embodiment the power/data unit further comprises a lid, wherein the lid is accessible from the pavement to provide access to the universal connector when in use. This allows easy access to the power/data unit when the time comes that a further unit is required for allowing access to the data and power. This also allows the concealment of the power/data units to prevent unsightly power/data units or hazards on a pavement but still allows the easy access for repair or maintenance without having to undertake large works.

In an embodiment the lid is provided flush with the surface of the pavement when in use. This provides the advantage that the power/data units do not have a negative visual impact on an otherwise empty location on a walkway. This also reduces any hazard associated to pedestrians and the power/data units as there is no step or object to have to negotiate.

In an embodiment an outwardly extending fixing means is provided on an outer surface of the power/data unit. The fixing means can be a flange that provides a surface by which it can be secured in the ground with concrete/cement or other material forming or being placed on either side of the flange to prevent removal of the power/data unit from the ground without removal of the material. This also means that the power/data unit resists sinking further into the ground as additional material must also be compacted under the flange. This prevents movement of the power/data unit when in use. In some embodiments the flange extends between 50 mm to 100 mm in distance from the outside surface of the power/data unit. In further embodiments the flange extends between 50 mm to 65 mm in distance.

In an embodiment the power/data unit comprises a pre-chamber and an inner chamber, wherein the inner chamber is removably contained within the pre-chamber. This allows a pre-chamber to be installed and an inner chamber to include all the components of the power/data unit. Therefore, additional protection such as from impacts or weather is provided for the inner chamber and components therein and also allows removal of the inner chamber for maintenance. In some embodiments the pre-chamber is manufactured such that it is suitably strong to resist the weight of objects positioned on the top thereof. In some embodiments the power/data unit has an internal volume of less than 150 litres.

In an embodiment an air gap is formed between an inner surface of the pre-chamber and an outer surface of the inner-chamber. The inner chamber is smaller dimensioned than the pre-chamber. This resulting gap provides heat dissipation for the operation of the components within the power/data unit. The air gap can also reduce the transfer of the noise produced, such as electrical noise, from the power/data unit.

In an embodiment at least one power and data aperture is provided for a cable for the universal connector and at least one power and data aperture is provided for a cable of the data and power connections. This provides access for the cables that will be connected to the charger unit, i.e. the universal connector and the cables that come in from the terminal. This allows the power/data unit to be mostly contained other than these apertures thus increasing its resistance to ingress of unwanted materials.

In an embodiment the apertures and lid of the inner chamber are sealable to form a sealed container. This ensures that although there are apertures, these are sealed, such as around a cable or by having a specific cable connector, to form a sealed connection. Furthermore, the use of two chambers ensures that access to the internals of the power/data unit has to be via two access lids and thus increases the safety and security of the power/data unit.

In an embodiment the power/data unit comprises a controller for controlling data connections positioned within the power/data unit. This allows smart control of data and can even balance data use where data has different priority. It can also form the virtual connections for the data to ensure the secure data transmission.

In an embodiment the power/data unit comprises a processor for edge computing for controlling data connections positioned within the power/data unit. As with the controller, this provides for intelligent control of data. This can reduce latency as control functions are carried out locally instead of being remotely provided.

Where there is a power connection, the controller/edge computing can also control that.

In an embodiment the power/data unit comprises a moisture remover for removing moisture from the power/data unit. This ensures that the components are kept in a dry environment and that moisture, such as from condensation, does not cause issues. This can be combined with using pre-chamber to reduce condensation within the inner-chamber.

In an embodiment the power/data unit comprises an IoT component connected to the power/data unit. Internet of Things (IoT) components can expand the functionality of the system as described above.

In an embodiment the power/data unit comprises a router and/or access point far transferring the data connection into a high-speed wireless connection. This allows the connection that enters the power/data unit to be converted into a form that is accessible to users and can also provide the wireless functionality so that users do not need to physically connect with the power/data unit for a connection.

In an embodiment, the data and power is supplied to the power/data unit from a terminal, wherein the terminal is connected to a data source and a power source. This allows the power/data units to be compact and not require the interface and data connections from a larger source that would increase their size and infrastructure required. Instead each power/data unit is connected to a terminal that can be used as the main hub for the data and power connections.

In an embodiment data access is provided to a nearby or adjacent dwelling by a data connection to the power/data unit. This allows proximate dwellings to connect to the power/data unit to obtain data such as Internet access, when required.

In an embodiment the data connection to provide data access to a nearby or adjacent dwelling is via a wireless connection. This removes the need for further cables or wires to obtain the data access and also allows for multiple data connections to, for instance, multiple dwellings, and equates "virtual" connections.

In a further aspect of the invention, there is provided a charging unit for charging electric vehicles, the charging unit comprising a power connection directly connectable to a vehicle to charge an electric vehicle; and a data connection connectable to a vehicle to enable transfer of data to and or from the vehicle; wherein the charging unit is connectable to a universal connector that provides a power supply and data supply to the charging unit. This provides a unit that allows for connection to an electric vehicle, where the unit only requires that a universal connector is provided that the charging unit is connectable to.

In an embodiment the charging unit comprises an RFID reader. This provides the advantage of a user being able to interact with the charging unit with an RFID reader to identify the user. Other types of readers or identification can also be used.

In an embodiment the charging unit comprises an access point to provide access to a data network through the data supply. This allows a house or dwelling that is nearby or adjacent to use the data connectivity that the charging unit has access to. This provides the advantage of the data access being changeable as required. In some cases only a data connection is provided for data access with no power connection.

In an embodiment the charging unit is in the form of a low-level unit or post unit. This ensures that the charging unit is not visually intrusive in the street. Other unit shapes could also be provided that are aesthetically pleasing or identifiable to the user as a charging unit for an electric vehicle.

In a further aspect of the invention there is provided a terminal for providing power for charging vehicles, wherein the terminal is configured to receive power from a source and have a data connection to a source; and provide data and power to a kerbside power/data unit for connection to a vehicle. This allows the terminal to be the hub or point for connections to a power source or data source. Where such connections may require greater infrastructure, so by having a single terminal for multiple power/data units, less disruption is required.

In an embodiment the data connection is by at least one of: fibre optic cable; copper cable; or wireless modem. This allows a fast data connection. In some embodiments the wireless modem could be a 4G or 5G connection for high speed data.

In a further aspect of the invention, there is provided a charging apparatus for vehicles, wherein the charging apparatus comprises the power and data power/data unit according to the second aspect and charging unit according to the third aspect, wherein the power/data unit and charging unit are connected together through the universal socket. This provides the advantage of a charging unit which can be connected and connectably removed from the power/data unit as required. For instance, the power/data unit can be installed in advance and the charging unit supplied later. It can also provide different technology within the charging unit as required. This also allows the data connection, such as a cable or even inductive charging, to be hidden until required, such as until such time that a charging point is required.

In an embodiment the universal socket provides a physical connection between the power/data unit and charging unit. This allows the direct connection of the power/data unit and charging unit to provide a fast, safe or reliable power and data connection for further use. In some embodiments any cables or connections within the universal connector can be placed within the power/data unit such that they are not exposed when not connected.

In an embodiment a terminal according to the fourth aspect is provided and is connected to the power/data unit to provide power and data connectivity. This provides the fast data and required power to the power/data unit or power/data units which in turn provides it to the charging unit.

In a further aspect of the invention, a method of installing a power/data unit is provided, wherein the method includes the steps of: installing a power/data unit beneath a pavement surface at a kerbside; providing a data connection to the power/data unit in communication with a data source; providing a power connection to the power/data unit in communication with a power source; providing an accessible universal connector for connecting unit to access power and/or data from the source for connection to an electric vehicle. This provides the advantage of power/data units being installed in advance of further units or charger units. This allows the infrastructure to be in place before it is required to be activated, such as cables laid in the ground. This allows the rapid deployment of power and data connections. In some embodiments a terminal can be installed at the same time. In further embodiments, data and power connections are provided to the terminal from the power/data unit. In some embodiments a power and data connection to the terminal is provided to the power grid and data source.

In a further aspect of the invention a method of installing a power and data access system for vehicles is provided, wherein the method comprises: providing a terminal, wherein the terminal has a power connection to a power source and has a high speed data connection to a data source; providing at least one power/data unit at a parking spot for vehicles and at a level below a surface of the ground; connecting the at least one power/data unit to the terminal using a wired connection such that power and data can be transferred between the terminal and the power/data unit, wherein the power/data unit transfers data to or from a vehicle using a wired or wireless connection and transfers data to or from user in wireless range; accessing the at least one power/data unit through an access lid to electrically connect a charger unit to the power/data unit to enable power to be transferred between the power/data unit and charger unit; and positioning the charger unit above a surface of the ground to allow the transfer of power between the power source and the charger unit via the terminal and power/data unit, wherein the charger unit is removable. This provides the advantage of charger units being removably installed such that they can be removed, replaced or installed after installation of the power/data units. Therefore, the data access is already provided by the power/data unit and allows use of this after infrastructure installation without the charger units.

In an embodiment the method further comprises; accessing a pre-chamber of the power/data unit through an access lid; and accessing an inner chamber of the power/data unit to gain access to the data connection and power connection. This allows the use of a pre-chamber to protect the inner chamber components, yet still allows access for installation and maintenance.

In an embodiment the method further comprises connecting IoT components to the power/data unit.

In a further aspect of the invention a method of providing data and power access for electric vehicles is provided, the method comprising: providing a power/data unit comprising: a high speed operational data connection providing data transfer between a vehicle and the power and data unit by wired or wireless connection; a high speed non-operational data connection providing two-way wireless data access with the power/data unit in a wireless range of the power/data unit; and a power connection providing electrical power transfer to and from an electric vehicle and the power/data unit; the method of providing data and power access further comprising: transferring the high speed operational data and high speed non-operational data between the power/data unit to and from a terminal at high speed (preferably 4G or 5G) through a wired connection; transferring the electrical power from the power/data unit to the terminal through a wired connection. Data that is required for the operation of a vehicle, such as related to charging or data for autonomous vehicles is the operational data. Non-operational data is the data that is not required by the vehicle or for using the charger unit for charging a vehicle. Instead this is the data that is used by users in nearby buildings, or users passing by that require an internet connection for example. The advantage of the method provides data sources for users and vehicles.

In an embodiment the method comprises encrypting the operational data and non-operational data between a server and data user. This provides the data sources for vehicles and users, yet does this with a secure protocol, such as HTTPS. The encrypting can be referred as secure data. In some embodiments the data can be encrypted prior to transport and decrypted server side. This provides an additional layer of secure data transmission which can be combined with the transport layer protocol, such as HTTPS. Therefore a two-stage secure transmission can be provided.

In an embodiment the method comprises receiving a request from an RFID device in communication with the power/data unit and enabling the transfer of the electrical power to and from an electric vehicle and the power data unit via a controller in the power/data unit. This ensures that a user can interact with the power access to transfer power, it can also increase safety as only authorised users can gain access to the enabled power connection.

In an embodiment the method further comprises, transferring the electrical power between the terminal and an external power source and transferring the high-speed data between the terminal and a data source. This provides access to the internet, for instance, for data access, which can allow authorized parties the use or transmittal of data, such as the car manufacturer, to ensure updates are delivered.

These and other features of the present invention will now be described in further detail, purely by way of example, with reference to the accompanying drawings, in which:

FIG. 1 shows a front view of a schematic according to the invention.

FIG. 2 shows sectional front view of a terminal according to the invention.

Figure 3:
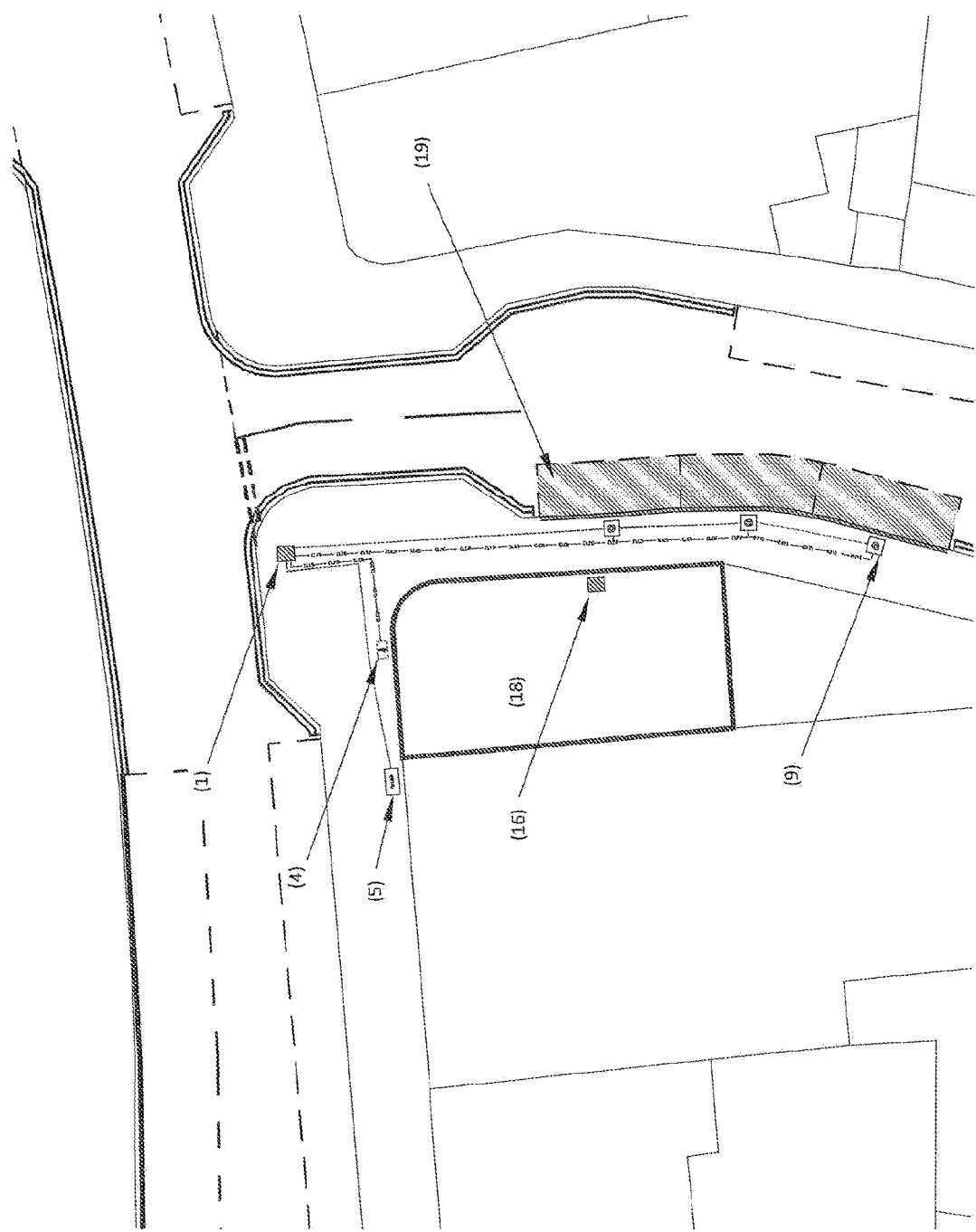
FIG. 3 shows a plan view according to the invention.

Referring first of all to FIG. 1, a kerbside power/data unit 9 is shown. Also shown is a charging unit 13. This is shown to be connected to a vehicle 17 and to a dwelling 18

Kerbside Power/data Unit

Kerbside power/data units 9 are connected to the power cable 4 in a series formation with the data cable 5 from each charge unit 13 connected directly to a terminal 1 with a copper coaxial cable.

The kerbside power/data unit can also be referred to as a box. This box is connected to data and power.

Figure 4:
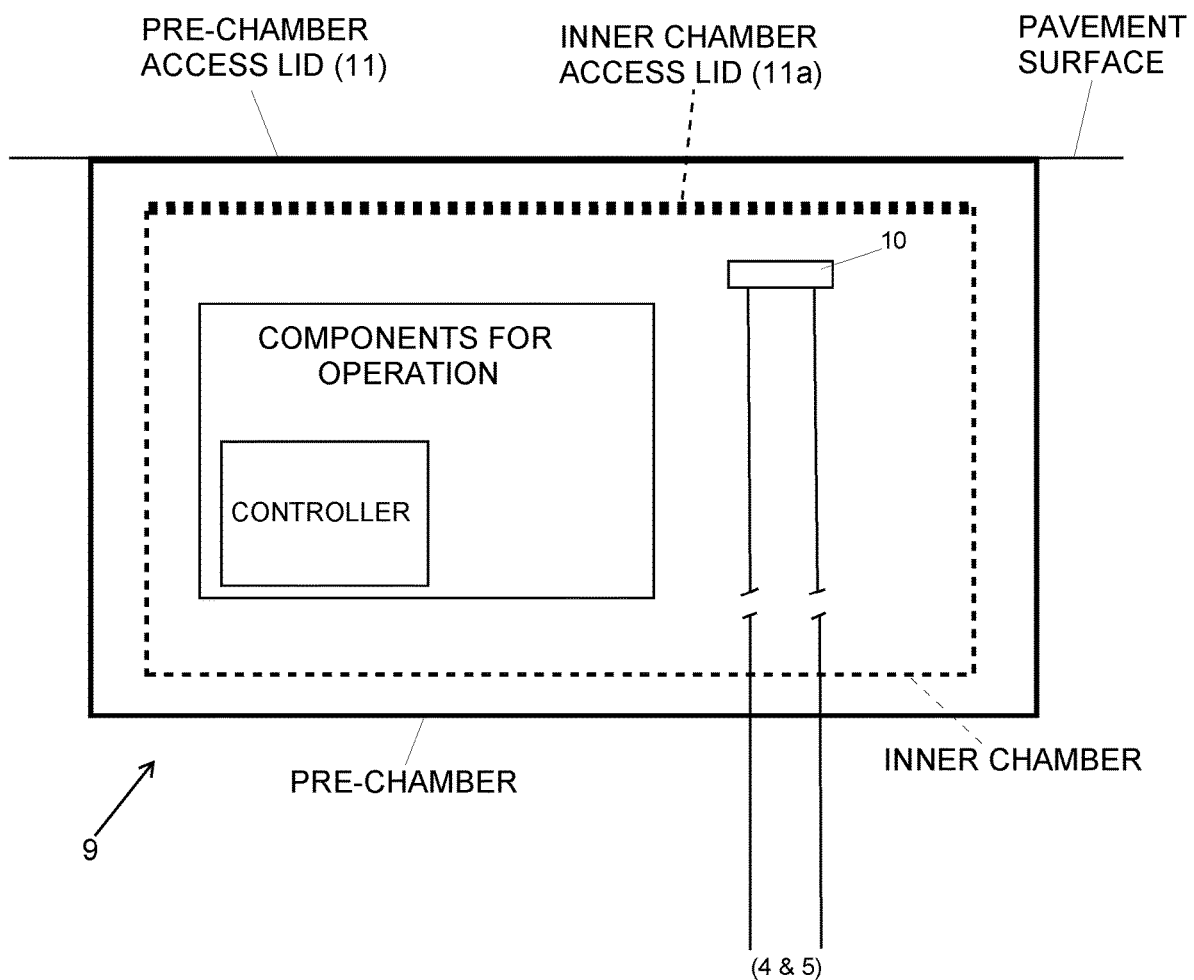
FIG. 4 is a block diagram showing basic features of a kerbside power/data unit (which may also be referred to as a power/data subsystem unit).

With additional reference to FIG. 4, both cables 4, 5 enter the kerbside power/data unit 9 and are terminated with a universal connector 10.

Each power/data unit 9 is installed flush to the adjoining surface to the parking bay and provides a facility for the power and data cable 4, 5 to terminate within the confines of the power/data unit 9 and with enough length to connect to the charger unit 13 when installed.

The power and data cable 4, 5 have a universal connector 10 that allows a simple and standardised connection to the charger unit 13. The universal connector 10 can be a connector that is capable of being connected to various devices without the need for a bespoke connector. Therefore, the internals of the power/data unit 9 can be easily transferred or changed by various vendors.

Whilst two cables are discussed, other arrangements are possible, such as the use of a single cable that can transport both power and data.

The power/data unit 9 houses components for operation of the apparatus and forms an intelligent mobility node. Within the power/data unit 9 are components that allow intelligent functions, in some embodiments, this can be a controller.

The power/data unit 9 can also house components further to the direct requirements of transferring data and/or power to and from a vehicle and transferring data to and from nearby users and dwellings. Such components can include features such as parking sensors to detect if a vehicle is using the parking bay (thus ensuring that charging can only commence when a vehicle is present) or any Internet of Things (IoT) component. These, for instance, can include environmental sensors, such as noise, air quality or traffic sensors. Such sensors, where data is not required for operational purposes (explained more in detail below) can either use the data transfer through the power/data unit 9 and terminal 1, or can use their own data transfer, such as through cellular data.

The power/data unit 9 can be a multi-chambered container. In one embodiment a pre-chamber is provided that is suitable for being placed in the ground. The pre-chamber can have fixing means for securing in the ground, these can be anchoring points or flanges for adhering to concrete or other materials placed around it when in situ. The power/data unit 9 can then use an inner chamber situated within the pre-chamber. The inner chamber can be smaller dimensioned than the pre-chamber such that an air gap is provided around the inner chamber. Therefore, a double thickness unit is formed. The power/data unit 9 generally refers to the inner chamber. However, it can be used to refer to the combined pre-chamber and inner chamber.

When the kerbside power/data unit 9 is not in use with the charger unit 13 it has a solid lid/plate or top plate 11 that sits at the finished surface level so there is no resulting hazard to pedestrians.

The solid lid 11 can be connected to the pre-chamber and the inner chamber can have a separate lid 11a. The lids can each sealably close the power/data unit 9. At least the inner chamber is waterproof. The solid lid 11 can be securely fastened to ensure unauthorised access to the power/data unit 9 is prevented and to prevent accidental access to the power/data unit 9 by the unseating or securing of the solid lid 11. Furthermore, the use of two chambers ensures that access to the internals of the power/data unit 9 has to be via two access lids and thus this is more difficult than a single chamber housing all components. This increases the safety and security of the power/data unit 9.

The pre-chamber is manufactured such that it is suitably strong to resist the weight of objects positioned on the top thereof. This is achieved through material choices and by use of strengthened chambers, by additional load bearing structures, where required. For instance, where vehicles will be travelling over or parked on the top of a pre-chamber, the pre-chamber is suitable for taking the weight of a HGV or equivalent.

The use of a pre-chamber provides an air gap around the power/data unit 9. This provides heat dissipation for the operation of the components within the power/data unit 9. The air gap can also reduce the transfer of the noise produced, such as electrical noise, from the power/data unit 9. The installation of the power/data unit 9 in the ground also assists with noise pollution for isolating noises. Therefore, any noise pollution of the power/data unit 9 is reduced.

Further to that discussed above, the installation in the ground of the power/data unit 9 reduces the visual impact, particularly where charger unit 13 are not yet installed. However, this is further assisted using a lid which can provide a suitable finish to a surface without the requirement for matching the existing kerbside, but, instead, by providing an indication that the kerbside is enabled by a power/data unit 9.

In an exemplary embodiment, a power data unit 9 can include components such as a moisture remover, a breaker, an electrical contactor, a transformer, a controller, IoT sensor components (for instance for air quality) and a wireless AP, such wireless connections can include LTE, 4G, 5G, Wi-Fi, WirelessHD and WiGig or cellular, etc. Some of these components can be positioned in the charger unit 13. For instance, the wireless access point can be positioned in the charger unit 13. These components are provided in a modular arrangement, as is the internal arrangement of the power/data unit 9 to allow different layouts as required. For instance, different connection points can be moved as appropriate and where functions and components are not required or can be replaced, this can be addressed also.

The use of a pre-chamber and internal chamber arrangement allows the easy exchanging of the internal chamber when the power/data unit 9 is replaced. This is useful for maintenance where instead of a single component being replaced and tested at an installation location, which would likely be a roadside, the whole pre-tested power/data unit 9 can be installed to replace a faulty one without the need for small or precision wiring connections to be made at the installation location. This also removes the need for any groundworks or excavation to obtain the internal chamber. Instead it is all accessible within a pre-chamber.

Several connections can be provided to and from the power/data unit 9. From the terminal 1, data and power cables are provided to the power/data unit 9. To the charger unit 13 from the power/data unit 9, a low voltage power connection is provided, this could be 12V and is used to power the ancillary features of charger unit 13 that do not include the car charging. A power cable for providing main power, for car charging is provided between the charger unit 13 and the power/data unit 9. A data cable is provided from the controller of the power/data unit 9 to the charger unit 13 to facilitate functions such as an RFID interface. A further data connection can also be provided to the charger unit 13, such as providing the car data transfer, or the non-operational data (explained below), such as those used by nearby users or dwellings. As discussed elsewhere in the documents, an aerial can be provided for the data transfer to an access point positioned within the power/data unit 9.

Although controllers are described, the power/data unit 9 can also use network edge computing to provide the control and operation functions. This can reduce latency times by having the controller at the point of the operation instead of having to connect back to the cloud for computing operations. Therefore, the components of the power/data unit 9 can be some other processing means. The power/data unit 9 is configured such that components can be exchanged as required and as technology develops.

The power/data unit 9 is water-proof and has an IP68 resistance. When sealed, the only openings on the power/data unit 9 are for the cables to pass through, where these are sealed around the cables. Equally, the pre-chamber also has opening or apertures for cables to pass therethrough. The cable connections for connection to a charger unit 13 can be positioned on an upper surface of the power/data unit 9. This allows the cables to transit without exiting the combined structure of the power data unit 9 and charger unit 13. However, lateral connections are also possible, such as where induction charging can be used and therefore the power is required to be positioned under a vehicle and not enter a vertically arranged charger unit 13.

Charger Unit

The charger unit 13 is interchangeable/connectable and able to be exchanged with other charging units 13 to the kerbside power/data, unit 9 and allows the kerbside power/data unit 9 to be installed in advance of the charger unit 13 and provides the ability for the appropriate authority, such as the land owner, council, home owner etc. to have the charger unit installed when there is demand (typically at the request of the resident).

The charger unit 13 can take many forms and will typically be a post or low-level unit formed to the kerbside. A low-level charger unit 13 can sit on a riser to increase its height. Where used, this can provide a higher level of visibility and allow easier access to the charger unit 13 where bending down to operate a low-level unit can be difficult. In some cases, the riser increases the height of the charger unit 13 so it is at least 400 mm off the surface of the ground. Where a post is used, the charger unit 13 can be attached to an existing post, such as a sign post or a lamp post, where appropriate.

The charge is expected to be in the range of 2.5 Kv to 7 kV. However, it is recognised that such values will vary as technology evolves. As with the power/data unit 9, the components are designed to be modular to allow components to be changed as required. An example of this is by using a universal connector 10, the charger unit 13 can be completely removed and replaced by a different charger unit 13 without the need for further ground works. Instead the charger unit 13 is unbolted from the power/data unit 9 and connections are disconnected as appropriate, e.g. depending on the number of connections, and a new charger unit 13 can be immediately installed. Or, alternatively, the lid of the pre-chamber can be reinstalled prior to a new charger unit 13 being made available.

In order to future proof the system, allowance is made in the kerbside power/data unit 9 for connectivity to an inductive charging unit 12.

The charger unit 13 has a socket means for connecting a cable to an electric vehicle to allow the transfer of power.

The charger unit 13 houses an RFID reader which allows the user to access the system through the charger. The user with this access will typically be a member of the system and have their details pre-registered on the central server. Each member will be allocated a unique RFID tag so the charger unit can determine the user when the tag is presented to the RFID reader.

The data cable 5 provides the data connectivity to the terminal 1 however in addition it is also connected to a data Access Point (AP) 15 which provides a high-speed wireless data connection to the adjoining vehicle 17, persons or persons within proximity of the signal of the AP 15 and to the adjoining house or dwelling 18.

The router works on the 5G signal bandwidth which is suited for the higher level of data transfer from both the house 18 and vehicle 17. To boost the strength of the signal, a Wi-Fi booster 16 is placed within the house 18 at the nearest socket to the charger unit 13.

The data connection access point 15 can require an aerial. The aerial can be connected to the access point 15 and positioned within the charger unit 13. Alternatively, the aerial can be positioned in the power/data unit 9. The aerial can also be positioned on suitable pre-existing infrastructure or elevated surfaces, such as poles, or on poles that are specifically installed. This has the advantage of providing a high-speed data service even when a charger unit 13 is not installed. Therefore, the power/data unit 9 can provide non-operational data (explained below) without having to provide operation data through the same power/data unit 9.

The charger unit 13 can have lighting means such as a downlighter to illuminate an area of the charger unit 13 itself, or an area around the charger unit 13. The illuminating means can be powered by the 12V connection. The illuminating means can illuminate part of a kerb or pavement for increased visibility, such as to alert as to where the charger unit 13 is positioned or to prevent tripping over a charger unit 13 at night or in low light. Alternatively, or additionally, the illuminating means can project an advert or notice on the charger unit 13 itself, or an area around the charger unit 13.

Where a post is used with the charger unit 13, the illuminating means can be integrated into the post. The illuminated means increases the visibility of the unit and enables the projection of a high-quality image such as a brand logo down onto a pavement or walkway. The illuminating means can be motion enabled to increase brightness or activate it as a person approaches or walks past the illuminating means of the charger unit. This reduces energy usage and light pollution, but also increases impact such as where adverts or branding is used.

The projection from the illuminating means can be changed (manually or remotely to electronically update) such as to change the image and colour. Therefore, the projection can be updated or adjusted where different branding is required, such as to show different sponsor organisations, etc. The projection can also update in real-time as different users walk past (or park next to) each individual charging unit such as in response to the user's preferences, which could be controlled by a phone app.

The charger unit 13 is made of any suitable material. However, in some embodiments, as the charger units 13 are on a street side and exposed to the environment, they can be made from recycled material and ideally at least 80% recycled material. This results in a durable material whilst minimising environmental impact. Recycled tyres can be used for the charger unit 13 body material.

The charger unit 13 provides a location for a power connection to be made to an electric vehicle. However, the components of routing the power, controlling the power and providing data is all housed within the power/data unit 9. Therefore, the components in the charger unit 13 can be minimised. This allows a charger unit 13 to be easily exchanged without the large removal of cables, connections or components. Furthermore, the expensive and/or sensitive components are housed beneath a surface level where they are less likely to be damaged. To fully minimise the components in a charger unit 13, a charger unit 13 can house a power connection and an RFID reader for accessing with a mobile device. Other components are optional.

Referring to FIG. 2, a terminal 1 is provided.

Terminal

The terminal 1 would be typically located at the start of a line of the charge units 13 and provides control components for the system (CPU) 3, electricity connection from the grid 4 and data connection 5.

Casual users can access the system through physical or contactless payment solutions though the in-built RFID reader 6. From the screen menu the user will have the ability to select the charge point number (by the corresponding bay number), speed and duration of charge. In some embodiments an RFID reader is not required and interaction can be solely through an app, or through sensors to commence or automate interaction.

The screen 2, as shown in FIG. 2, is optionally provided on the terminal. Various uses for such a screen can be provided, such as an information point, or details regarding the charging system. This can be customisable for the local requirements of the area/provider of the system.

Access, to interact with the system, such as to select charging options, can be via interfaces such as the use of a mobile device directly with the power/data unit 9, or through other means of identification of the specific charger unit 13 or power/data unit 9 and interfacing through an online portal with the identification details of the device that is required to be used.

The data connection into the terminal 1 is typically a fibre optic or copper coaxial cable however in areas where this is not achievable a secondary wireless connection can be established through the optional in-built modem 7 preferably 4G and 5G depending on local coverage. Therefore, in some cases, the data connection to the wider network, such as the internet and cloud, can be via a wireless connection, such as 5G, and the data access for vehicles, IoT components and nearby users and houses is also through a wireless connection that also can be 5G.

The data cable 5 is connected to a router which will provide a separate data cable 5 to each charge unit 13.

The terminal 1 is connected to a central control server through the Internet which maintains the customer account details and calculates the user's bill through electricity consumption based on the time of connection/disconnection rate of charge and time of day.

Referring to FIG. 3, a terminal 1 is shown that is connected to a power source 4 and a data source 5, cables or connections are then run from the power and data source to the terminal and further connections are run to the kerbside power/data unit 9 and charger unit 13 (if installed). As can be seen, the data cable 5 is connected to each kerbside power/data unit 9 and the power cable 4 is connected in series to the row of kerbside power/data units 9.

Charging bays parking spaces 19 are also provided adjacent to the kerbside power/data units 9 where an electric vehicle 17 can be parked to gain access to the power and or data from the associated charger unit 13. A house is also shown with a wireless data booster 16 that obtains data access from the kerbside power/data unit 9/charger unit 13.

As the terminal 1 is connected to all the power/data units 9, it is capable of intelligently balancing and distributing power as required by working with the controllers in all the power/data units 9. Therefore, where several vehicles are being charged, the terminal 1 and controllers can increase charge rates for some vehicles or reduce them as appropriate depending on amount of charge required, power bandwidth available and types of charges requested by the user. Where a vehicle is particularly low on charge, the charging for this vehicle can be prioritised to ensure a certain level of charge is met quickly, should the vehicle be required in an emergency. Balanced charging can then recommence.

Such an arrangement also allows the terminal 1 and power/data units 9 to feed power to the grid, battery silo, or local supply network. This network of batteries can be used for frequency response where usually rotating plant with spare capacity would be required. Instead, the batteries from the automated vehicles that are plugged into charger units 13 can be used to provide electricity to the grid when required.

In such a situation where power is used from the batteries, the system can intelligently redistribute power back into vehicles by exceeding the speed of charging to ensure that the expected level of charge is still achieved in the same period.

Offering different rates of charging can also be used to incentivise users. In such a situation, a user that opts for a slow charge can receive a reduced cost or incentivisation by other means, such as points to encourage such behaviour. This can result in extending the period before the end of life of the battery but can also allow the battery of the electric vehicle to be used for other purposes, such as the frequency response discussed above.

Data Paths

As described above, the apparatus uses data in various manners. For instance, in the use of autonomous vehicles, data that will be required to be transferred to and from the vehicle will include GPS data, safety data, performance updates, user preference data for vehicle functions and routing, etc. In particular, it is expected that a large amount of data will need to be transmitted from an autonomous vehicle back to a server for ensuring compliance and insurance requirements. This is presently expected to be in the magnitude of gigabytes, but is likely to increase as systems become more sophisticated. Therefore, this is data that is required for the operation of the vehicle and is operational data. The operational data will be large and thus the need for a high-speed data connection to ensure that the required data is transferred before the vehicle is required again otherwise this could lead to delays in functionality.

There can also be smaller operational data that could be related to authenticating of users to use the charging device and linking to an account. This could be via data passed to and from the RFID device, and data transmitted via a user's mobile device, which could also be connected to the wireless connection of the power/data unit 9 or cellularly and the data transfer to provide the controller or other processor to accept the request to use the charger unit 13.

There can be additional operational data, such as sensors related directly to the cars, such as parking sensors. Therefore, a controller can prevent the initiation of an electric charge from a charge unit 13 if a car is not present in the relevant space or spaces associated with the charger unit 13.

There is also the non-operational data. This data is the data that is not required by the vehicle or for using the charger unit 13 for charging a vehicle. Instead this is the data that is used by users in nearby buildings, or users passing by that require an internet connection. Therefore, this is a data connection that people, including businesses, shops, schools, hospitals, can access for general data access and does not relate to the data required to operate the autonomous vehicle. This data, when accessed at a charger unit 13, or a power/data unit 9, is then connected to the terminal 1 via a high speed wired connection, such as a fibre connection.

There can also be sensors that use non-operational data, such as an environmental sensor for detecting the environmental conditions. The power/data unit 9 can be used to provide a data connection and a power connection or both to enable the sensors to operate.

The data connection to the vehicle for the transfer of data does not need to be a physical connection, such as through a cable connected to charger unit 13, instead the wireless connection can be relied upon to transfer data. Furthermore, whilst there is known to be a large amount of data that will need to be transferred between a vehicle and the relevant server, e.g. the operational data discussed above, where wireless data connections are suitably fast, such as with 5G data, it is possible to transfer data not only between stationary cars that are plugged into a charger unit, but also between vehicles that transit through a street with power/data units 9 present to allow access to the wireless network.

To this end, the controller can provide priority to certain users to ensure that data is provided where it is primarily needed. For instance, autonomous vehicles can have priority to ensure that the essential data is transferred to provide full functionality of the vehicle.

As both types of data, operation and non-operation can contain sensitive information, such information needs to be secure. This is particularly true of the non-operational data which could be personal data from a person's household or handheld data connection, or sensitive information provided by businesses, for instance a hospital. Therefore, the wireless connection to the power/data unit 9 anonymises data and furthermore uses a secure protocol. Such protocols that can be used are Hypertext Transfer Protocol Secure (HTTPS) or Transport Layer Security (TLS). Here, when encrypting data using HTTPS (or the underlying TLS and SSL protocols) the server will securely contain a 'private' key, and a 'public' key will be issued when required to decrypt any data secured with the private key. Conversely any data encrypted with the public key can only be decrypted by the private key contained on the server. Therefore, by using such an asymmetric Public Key Infrastructure (PKI) system, data transferred to or from the power/data unit 9 is secured and only able to be accessed by the owner of the appropriate key, such as that secured on the server. HTTPS is a transport layer protocol therefore the data transfer channel is secure. Data will also be encrypted prior to transport and decrypted on the server side. Therefore a two-stage secure transmission service is provided.

The present invention has therefore been described above by way of example.

Further embodiments are set out in the following clauses:

Clause One: A charging apparatus for vehicles, wherein the charging apparatus comprises: a terminal, wherein the terminal is configured to receive power from a power source and have a data connection to a data source; and at least one box positioned at a roadside, wherein the at least one box is connected to the terminal such that power and data can be transferred between the terminal and the box; wherein the at least one box is configured to provide power to a vehicle, and receive and/or transmit data from a vehicle.

Clause Two: The charging apparatus of Clause One, wherein the box is configured to provide access to a data network.

Clause Three: The charging apparatus of Clause Two, wherein the access to the data network is provided to a dwelling.

Clause Four: The charging apparatus of any preceding Clause, wherein the data source is a high speed data source.

Clause Five: The charging apparatus of any preceding Clause, wherein the power source is connected to the power grid.

Clause Six: The charging apparatus of any preceding Clause, wherein the data received from the vehicle to the box is transferred to the terminal.

Clause Seven: The charging apparatus of any preceding Clause, wherein the box is placed at a kerbside and does not protrude above a pavement surface.

Clause Eight: The charging apparatus of any preceding Clause, wherein the box is connectable to a charging unit, the charging unit providing the connection to provide power to a vehicle.

Clause Nine: The charging apparatus of Clause Eight when dependent on Clause Two or Three, wherein the charging point provides the access to a data network.

Clause Ten: The charging apparatus of Clause Nine, wherein the access to the data network is accessed by a WiFi booster.

Clause Eleven: The charging apparatus of any preceding Clause, wherein the data connection between the terminal and the box is via a copper coaxial cable.

Clause Twelve: The charging apparatus of any preceding Clause, wherein when a plurality of boxes is provided, each box has a direct data connection to the terminal Clause Thirteen: The charging apparatus of any preceding Clause, wherein when a plurality of boxes is provided they are connected in series to the power supplied from the terminal.

Clause Fourteen: A power and data box for charging electric vehicles, the box comprising: data and power connections; and a universal connector that is connectable to a further unit that provides access to at least one of data and power from the box, wherein the box is installable at a kerbside and does not protrude above a surface of a pavement.

Clause Fifteen: The power and data box of Clause Fourteen, wherein the box further comprises a lid that is accessible from the pavement to provide access to the universal connector.

Clause Sixteen: The power and data box of Clause Fifteen, wherein the lid is provided flush with the surface of the pavement.

Clause Seventeen: The power and data box of any one of Clause Fourteen to Clause Sixteen, wherein the data and power is supplied to the box from a terminal, wherein the terminal is connected to a data source and a power source.

Clause Eighteen: The power and data box of any one of Clauses Fourteen to Seventeen, wherein access to the data network is provided to a nearby or adjacent dwelling by a data connection to the box.

Clause Nineteen: The power and data box of Clause Eighteen, wherein the data connection to provide access to a data network to a dwelling is via a wireless connection.

Clause Twenty: A charging unit for charging electric vehicles, the charging unit comprising: a power connection directly connectable to a vehicle to charge an electric vehicle; and a data connection connectable to a vehicle to enable transfer of data to and or from the vehicle; wherein the charging unit is connectable to a universal connector that provides a power supply and data supply to the charging unit.

Clause Twenty-One: The charging unit of Clause Twenty, wherein the charging unit comprises an RFID reader.

Clause Twenty-Two: The charging unit of any one of Clauses Twenty to Twenty-One, wherein the charging unit comprises an access point to provide access to a data network through the data supply.

Clause Twenty-Three: The charging unit of any one of Clauses Twenty to Twenty-Two, wherein the charging unit is in the form of a low level unit or post unit.

Clause Twenty-Four: A terminal for providing power for charging vehicles, wherein the terminal is configured to receive power from a source and have a data connection to a source; and provide data and power to a kerbside box for connection to a vehicle.

Clause Twenty-Five: The terminal of Clause Twenty-Four, wherein the data connection is by at least one of: fibre optic cable; copper cable; or wireless modem.

Clause Twenty-Six: The terminal of Clause Twenty-Five, wherein an interface screen is provided to allow a user to interact and select power requirements for charging an electric vehicle.

Clause Twenty-Seven: A charging apparatus for vehicles, wherein the charging apparatus comprises: a power and data box according to any one of Clauses Fourteen to Nineteen; and a charging unit according to any one of Clauses Twenty to Twenty Three; wherein the box and charging unit are connected together through the universal socket.

Clause Twenty-Eight: The charging apparatus according to Clause Twenty-Seven, wherein the universal socket provides a physical connection between the box and charging unit.

Clause Twenty-Nine: The charging apparatus according to Clause Twenty-Seven to Twenty-Eight wherein a terminal according to any one of Clauses Twenty-Four to Twenty-Six is provided and is connected to the box to provide power and data connectivity.

Clause Thirty: A method of installing a box according to Clause Fourteen, wherein the method includes the steps of: installing a box beneath a pavement surface at a kerbside; providing a data connection to the box in communication with a data source; providing a power connection to the box in communication with a power source; providing an accessible universal connector for connecting a unit to access power and/or data from the source for connection to an electric vehicle.

The invention claimed is:

1. A power and data access system for vehicles, wherein the system comprises:
   a terminal connected to a plurality of power and data sub-system units, the power and data sub-system units being remote from the terminal, wherein each power and data sub-system unit is configured to be connected to a charger unit positioned above the power and data sub-system unit,
   the terminal being positioned on a street side, wherein the terminal is configured to receive electrical power from a power source and has a high speed data connection to a data source;
   each power and data sub-system unit having a respective chamber that is positioned at a parking spot for vehicles and at a level below a surface of the ground, wherein each power and data sub-system unit comprises a controller within the chamber, and each power and data sub-system unit is connected to the terminal such that power and data are transferrable between the terminal and the power and data sub-system unit and the transfer is controllable by the controller;
   wherein each power and data sub-system unit comprises an access plate to the chamber and a connector, the connector being accessible from the street level via the access plate, the connector being connectable to an interchangeable charger unit that is positioned above the sub-system unit on the street side and is accessible to a user to connect to a vehicle to transfer electrical power between the vehicle and the terminal via the power and data sub-system unit;
   wherein each power and data sub-system unit includes an access point to provide wireless connection and is configured to transfer high speed data to or from a vehicle or transfer data to or from a user in wireless connectivity range via the access point.

2. The power and data access system according to claim 1, wherein the data transferred by the high speed data connection is encrypted data, and where the data transport protocol provides secure encryption.

3. The power and data access system according to claim 1, wherein an aerial is provided to connect to the high speed data connection within the power and data sub-system unit to provide increased wireless range.

4. The power and data access system according to claim wherein the aerial is located in the charger unit.

5. The power and data access system according to claim 1, wherein a socket is provided in the charger unit by which the transfer of power to or from a vehicle and the power and data sub-system unit is via the socket.

6. The power and data access system according to claim 1, wherein the access plate sits flush with the surface of the ground.

7. The power and data access system according to claim 1, wherein the charging unit is a low level unit for positioning directly on the ground or a post unit for attaching to a post.

8. The power and data access system according to claim 1, wherein the charging unit comprises an RFID reader, wherein enabling the transfer of power to or from a vehicle is at least via interaction with the RFID reader.

9. The power and data access system according to claim 1, wherein the charging unit comprises illuminating means, wherein in use, the illuminating means is configured to illuminate the charging unit or an area around the charging unit.

10. The power and data access system according to claim 9, wherein the illuminating means comprises a sensor for controlling an image illuminated.

11. The power and data access system according to claim 1, wherein the controller uses edge computing.

12. The power and data access system according to claim 1, wherein IoT components are connected to the power and data sub-system unit.

13. The power and data access system according to claim 12, wherein the IoT components are housed within the chamber.

14. A method of providing data and power access for electric vehicles, the method comprising:
   providing a terminal at a street side, wherein the terminal includes a power connection to an electrical power source and a high speed data connection to a data source;

providing a plurality of power and data sub-system units remote from the terminal, and connecting each of the power and data subsystem units to the terminal using a wired connection, each of the power and data sub-system units having a respective chamber that is positioned at a parking spot for vehicles and at a level below a surface of the ground, wherein each power and data sub-system unit comprises a controller within the chamber, the controller controlling:

a high speed operational data connection providing data transfer between a vehicle and the power and data sub-system unit;

a high speed non-operational data connection providing two-way wireless data access with the power and date sub-system unit in a wireless range of the power and data sub-system unit; and a power connection providing electrical power transfer to and from an electric vehicle and the power and data sub-system unit;

the method of providing data and power access further comprising:

transferring the high speed operational data and high speed non-operational data between the power and data sub-system unit and the terminal at high speed through the wired connection; and transferring the electrical power from the terminal to the power and data sub-system unit through the wired connection.

15. The method of providing data and power access according to claim 14, wherein the method further comprises receiving a request from an RFID device in communication with the power and data sub-system unit and enabling the transfer of the electrical power to and from an electric vehicle and the power and data a sub-system unit under control by the controller.

16. The method of providing data and power access according to claim 14, wherein the method further comprises, encrypting the operational data and non-operational data between a server and data user.

17. A method of installing a power and data access system for vehicles, wherein the method comprises:

providing a terminal at a street side, wherein the terminal includes a power connection to an electrical power source and a high speed data connection to a data source;

providing of a plurality of power and data sub-systems units remote from the terminal, each of the power and data sub-system units having a respective chamber that is positioned at a parking spot for vehicles and at a level below a surface of the ground, wherein each power and data sub-system unit comprises an access lid to allow access to the chamber from street level and a controller within the chamber for controlling the transfer of electrical power and data through the power and data a sub-system unit;

connecting each power and data sub-system unit to the terminal using a wired connection such that power and data can be transferred between the terminal and the power and data sub-system unit and is controlled by the controller, wherein the power and data sub-system unit transfers data to or from a vehicle or transfers data to or from a user in wireless range;

accessing each power and data sub-system unit from street level through the access lid to electrically connect a respective interchangeable charger unit to the power and data sub-system unit to enable electrical power to be transferred between the power and data sub-system unit and the charger unit; and positioning the charger unit above the power and data sub-system unit at street level to allow user to connect an electric vehicle to the charger unit, wherein the controller controls the transfer of electrical power between the power source and vehicle via the charger unit, terminal and power and data sub-system unit.

18. The method of installing a power and data access system according to claim 17, wherein the chamber is a pre-chamber of the power and data sub-system unit, the power and data sub-system unit has an inner chamber within the pre-chamber and in which the controller is located, and the accessing step comprises:

accessing the pre-chamber of sub-system unit through the access lid; and accessing the inner chamber to gain access for data connection and power connection.

19. The method of installing a power and data access system according to claim 17, further comprising connecting IoT components to the power and data sub-system unit.

\* \* \* \* \*